United States Patent
Hirotsune et al.

(10) Patent No.: US 8,703,307 B2
(45) Date of Patent: Apr. 22, 2014

(54) PERPENDICULAR MAGNETIC RECORDING MEDIUM AND MAGNETIC STORAGE APPARATUS USING THE SAME

(75) Inventors: Akemi Hirotsune, Odawara (JP); Yotsuo Yahisa, Odawara (JP); Ichiro Tamai, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 485 days.

(21) Appl. No.: 12/903,135

(22) Filed: Oct. 12, 2010

(65) Prior Publication Data
US 2012/0087034 A1 Apr. 12, 2012

(51) Int. Cl.
G11B 5/66 (2006.01)

(52) U.S. Cl.
USPC ........................... 428/831.2; 428/831

(58) Field of Classification Search
None
See application file for complete search history.

(56) References Cited

U.S. PATENT DOCUMENTS

| 7,150,895 B2 * | 12/2006 | Watanabe et al. ........... 427/126.3 |
| 7,175,925 B2 | 2/2007 | Chen et al. |
| 7,641,989 B2 | 1/2010 | Takekuma et al. |
| 2006/0093867 A1 | 5/2006 | Takenoiri et al. |
| 2007/0141401 A1 | 6/2007 | Maeda et al. |
| 2007/0223142 A1 | 9/2007 | Takekuma et al. |
| 2007/0231609 A1 | 10/2007 | Ajan et al. |
| 2008/0113221 A1 | 5/2008 | Hirayama et al. |
| 2009/0116137 A1 | 5/2009 | Takekuma et al. |
| 2009/0147403 A1 * | 6/2009 | Araki et al. .................... 360/135 |
| 2010/0021770 A1 | 1/2010 | Hazanov et al. |
| 2010/0046116 A1 | 2/2010 | Shimizu et al. |

FOREIGN PATENT DOCUMENTS

| JP | 2006/286103 A | 10/2006 |
| JP | 2009/009701 A | 1/2009 |
| JP | 2009/140562 A | 6/2009 |
| JP | 2009/245484 A | 10/2009 |
| JP | 2010/086651 A | 4/2010 |

OTHER PUBLICATIONS

Hashmioto et al., "Pseudo-hcp nonmagnetic intermediate layer for granular media with high perpendicular magnetic anisotropy," Journal of Phys. D; Appl. Phys. vol. 41, No. 1, Jan. 7, 2008, 7 pgs.

* cited by examiner

*Primary Examiner* — Holly Rickman
(74) *Attorney, Agent, or Firm* — Zilka-Kotab, PC

(57) ABSTRACT

According to one embodiment, a perpendicular magnetic recording medium includes a soft magnetic underlayer formed above a substrate, a lower seed layer formed above the soft magnetic underlayer, at least one upper seed layer formed above the lower seed layer, an interlayer formed above the at least one upper seed layer, a perpendicular recording layer formed above the interlayer, and a protective layer formed above the perpendicular recording layer, wherein the at least one upper seed layer comprises Ni or a Ni based alloy including N, and wherein the lower seed layer includes Ni and at least one element selected from a group consisting of: W and Cr. Other embodiments are described herein regarding perpendicular magnetic recording systems and methods of producing perpendicular magnetic media.

14 Claims, 19 Drawing Sheets

PERPENDICULAR MAGNETIC RECORDING MEDIUM AND MAGNETIC STORAGE APPARATUS USING THE SAME

FIELD OF THE INVENTION

The present invention relates to a perpendicular magnetic recording medium and a magnetic storage apparatus which are suitable for high-density magnetic recording, and which provide compatibility between finer crystal grains in the recording film and good C-axis crystal orientation.

BACKGROUND OF THE INVENTION

In order to realize higher-density recording which results in higher-density reproduction, it is important to reduce the grain size of the recording layer of magnetic media. Several approaches, such as reducing the thickness of a crystalline seed layer and/or a Ru/Ru alloy interlayer, or alloying the crystalline seed layer, have been proposed to try to reduce a grain size of the interlayer and recording layer above the interlayer. These approaches, however, bring undesirable consequences, such as size distribution widening, degradation in crystallographic texture (particularly in the C-axis orientation), degradation in magnetic decoupling in the recording layer, etc. Therefore, enlargement of the magnetic cluster size occurs in many cases. The problem here is that physically smaller grain size is not necessarily equivalent to magnetically smaller cluster sizes. This undesirable nature makes it difficult to improve recording and reproduction characteristics of magnetic heads and magnetic media, and in most cases, recording and reproduction characteristics become worse because of the physically small grain size of the recording layer.

Presently, the areal recording density of magnetic disk devices, such as hard disk drives (HDDs), is at least several hundreds of Gbit/in$^2$, and as the areal recording density increases, recording methods have moved away from the longitudinal magnetic recording method to the perpendicular recording method. When high-density recording is carried out with such a method, magnetic flux leakage from adjacent bits acts in the direction which stabilizes the magnetization, and therefore this method is clearly more effective for increasing density than longitudinal magnetic recording. In order to achieve higher density recording in the future, such as on the order of 1 Tbit/in$^2$, the bits will need to be finer, and it will be necessary to refine the grain size in the recording film accordingly.

Investigations have been carried out in the past into refining the recording film grain size and promoting crystal growth using techniques involving thinner seed layers and seed layers made of various kinds of materials, which are discussed below.

U.S. Patent Appl. No. 2010/0021770 discloses that crystal growth is enhanced when a Ni alloy is used in the seed layer in a perpendicular magnetic recording medium. Japanese Patent Pub. No. JP 2009-245484 discloses that it is possible to refine the size of the magnetic grains without reducing the magnetic grain density in magnetic layers when Ni is the main component in a perpendicular magnetic recording medium and use is made of an orientation control layer to which an oxide has been added. However, the orientation control layer in this medium is a single layer, and the rate of refinement is less than 10%. U.S. Patent Appl. No. 2007/0231609 discloses that crystal growth is promoted in the interlayers by using an underlayer containing Al, Cu, Ni, Pt, and NiFe in the perpendicular magnetic recording medium.

However, even though crystal growth is promoted in these methods, there are problems in that the crystal grains are not refined or the refining effect is small, or in that there is a deterioration in the C-axis crystal orientation (orientation in the perpendicular direction) when the recording film grain size is sufficiently small, which impairs the recording and playback characteristics.

Therefore, it would be beneficial to have a magnetic recording medium and recording/playback apparatus that could avoid the limitations and problems of conventional devices.

SUMMARY OF THE INVENTION

According to one embodiment, a perpendicular magnetic recording medium includes a soft magnetic underlayer formed above a substrate, a lower seed layer formed above the soft magnetic underlayer, at least one upper seed layer formed above the lower seed layer, an interlayer formed above the at least one upper seed layer, a perpendicular recording layer formed above the interlayer, and a protective layer formed above the perpendicular recording layer, wherein the upper seed layer is Ni or Ni based alloy including N, and wherein the lower seed layer includes Ni and at least one element selected from a group consisting of: W and Cr.

Any of these embodiments may be implemented in a magnetic data storage system such as a disk drive system, which may include a magnetic head, a drive mechanism for passing a magnetic medium (e.g., a hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
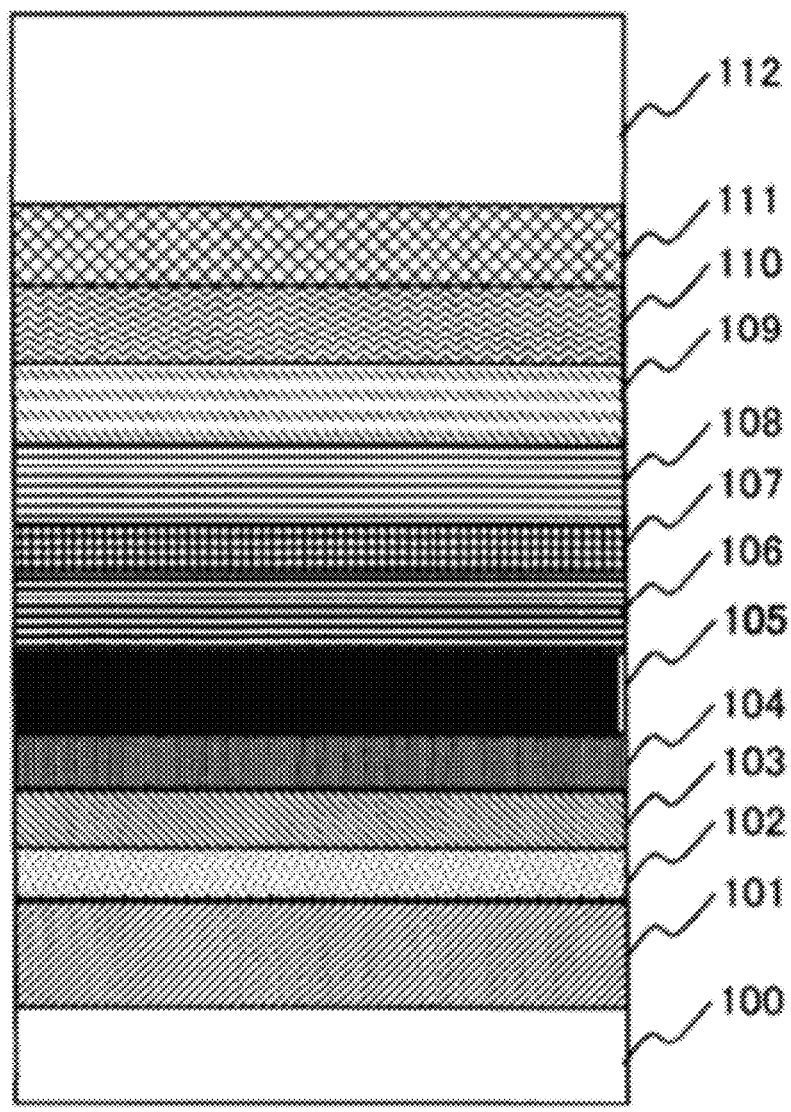
FIG. 1 is a cross sectional schematic diagram showing a structure of a perpendicular magnetic recording medium, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Unless contraindicated, all notation relating to compositions in the exemplary embodiments described below refers to at %.

According to one general embodiment, a perpendicular magnetic recording medium includes a soft magnetic underlayer formed above a substrate, a lower seed layer formed above the soft magnetic underlayer, at least one upper seed layer formed above the lower seed layer, an interlayer formed above the at least one upper seed layer, a perpendicular recording layer formed above the interlayer, and a protective layer formed above the perpendicular recording layer, wherein the upper seed layer comprises Ni or a Ni based alloy including N, and wherein the lower seed layer includes Ni and at least one element selected from a group consisting of: W and Cr.

One issue which is addressed by embodiments presented herein lies in providing a perpendicular magnetic recording medium and a magnetic storage apparatus using the medium, which offer compatibility between finer crystal grains and good C-axis crystal orientation characteristics, without any deterioration in the perpendicular orientation even when the recording film grain size is refined.

According to one embodiment, a perpendicular magnetic recording medium may include at least the following layers stacked in succession on a substrate: a soft magnetic underlayer, an interlayer, a perpendicular recording layer, a protective layer, and two or more seed layers.

According to one exemplary embodiment, a perpendicular magnetic recording medium may include a first seed layer and a second seed layer from a side which is closer to the substrate. The first seed layer may include Ni with at least one element selected from W and Cr, and the second seed layer may include Ni or a Ni based alloy including N, wherein the Ni based alloy includes at least one element selected from V, Cr, Nb, Mo, Ta, and W, according to various embodiments.

According to one embodiment, a perpendicular magnetic recording medium in which the grain size is refined while correct orientation of the interlayers and recording layer is maintained may be created.

According to one exemplary embodiment, the perpendicular magnetic recording medium may include the following layers stacked in succession on a substrate: a soft magnetic underlayer, an interlayer, a perpendicular recording layer, and a protective layer, along with at least two seed layers.

In one alternative embodiment, the perpendicular magnetic recording medium may include a first seed layer and a second seed layer from the side closer to the substrate, the first seed layer possibly including Ni with W and Cr, and the second seed layer possibly including N, and Ni with Cr.

Referring now to the figures, FIG. 1 schematically shows a cross-sectional structure of a perpendicular magnetic recording medium, according to one exemplary embodiment, comprising a nitrogen-doped second seed layer 105. The following layers may be formed in succession on a substrate 100: an $Ni_{63}Ta_{38}$ layer of about 30 nm in thickness as an adhesion underlayer 101; an Fe—Co—Ta—Zr layer of about 30 nm in thickness as a soft magnetic layer 102; an $Ni_{63}Ta_{38}$ layer of approximately 4 nm in thickness as an underlayer 103; an $Ni_{84}Cr_{10}W_6$ layer of approximately 3 nm in thickness as a first seed layer 104; an $Ni_{89}Cr_{10}N_1$ layer of approximately 2 nm in thickness as a second seed layer 105; an Ru layer of approximately 4 nm in thickness as a first interlayer 106; an Ru layer of approximately 8 nm in thickness as a second interlayer 107; an Ru-oxide layer 108 of approximately 1 nm in thickness as an onset layer; a Co—Cr—Pt-Oxide layer 109 of approximately 13 nm in thickness as a recording layer; a $Co_{61}Cr_{19}Pt_{12}B_8$ layer 110 of approximately 3 nm in thickness as a cap layer; and a C (carbon) layer of approximately 3 nm in thickness as a protective layer 111. The layers may each be formed by DC sputtering. A lubricant 112 may then be coated on the C layer to approximately 1 nm in thickness. Of course, these thicknesses are illustrative only, and any thicknesses may be used as would be apparent to one of skill in the relevant art.

In this embodiment, the second seed layer may be formed by a method in which sputtering may be carried out with a gaseous mixture of Ar and $N_2$ containing $N_2$ gas, and N may be doped in the seed layer with a nitride target being used, or by any other method.

Also, concerning the interlayers, Ru was formed to about 4 nm in thickness under low gas pressure (about 1.4 Pa) as a first interlayer 106, after which Ru was formed to about 8 nm in thickness under high gas pressure (about 5 Pa) as a second interlayer 107. In this way, a flat film was produced under low gas pressure and the crystallinity was arranged. Unevenness was produced thereon by film formation under high gas pressure, whereby it was possible to form on this shape a recording layer which had good crystal orientation in the perpendicular direction and in which the crystal grains were separated at the grain boundary. If the gas pressure range when the interlayers are formed are set at approximately 1-2 Pa for the low gas pressure and approximately 4-10 Pa for the high gas pressure, an effect may be achieved whereby an uneven shape may be formed, separation of the recording layer may be promoted, and good crystal orientation properties are achieved, according to one embodiment.

Formation of the recording layer involved producing an oxide grain boundary structure, and therefore trace amounts of oxygen were added to the sputtering gas when the layer was formed. The composition of the recording layer maybe the same from top to bottom, but multiple layers having different compositions may alternatively be formed, such as layers in which there is a large amount of oxide at the bottom, becoming steadily less toward the top, or layers in which there may be a Cr concentration gradient between top and bottom in the recording layer grain core, in several approaches.

For the protective layer, a C—N film was formed by reactive sputtering including gas and using a C target, but any method known in the art may be used.

The mean crystal grain size of the perpendicular magnetic recording medium having the nitrogen-doped second seed layer 105 was evaluated by transmission electron microscopy (TEM) observation, or the crystallite size is obtained from the distortion of the X-ray diffraction peak measured by in-plane X-ray diffraction using the Scherrer method. The crystallite size shows somewhat smaller values than the mean crystal grain size obtained by TEM, but the two methods have a proportional relationship and either method makes it possible to evaluate the refinement effect.

The grain pitch in the medium of Comparative Example 1 was 9.4 nm, and the core size was 8.6 nm. The grain pitch in the medium in Comparative Example 2 was 9.0 nm, and the core size was 8.6 nm.

In contrast, the grain pitch in the medium of Exemplary Embodiment 1 employing an N-doped seed layer was 7.8 nm, and the core size was 7.2 nm. With the medium of Exemplary Embodiment 1, it was possible to refine the grain size to 83% of the grain size in Comparative Example 1 and to 86% of the grain size in Comparative Example 2, the media in the comparative examples not having the N-doped seed layer. The coercive force was measured at 4.5 kOe for the medium in Exemplary Embodiment 1, and suitable magnetic characteristics were obtained.

In this exemplary embodiment, the grain pitch may be defined as the distance from the center of a crystal grain to the center of the adjacent crystal grain. In other words, the grain pitch constitutes the combined core and grain boundary width. The core size may be the grain diameter which may be obtained from the crystal grain surface area when the crystal grain may be seen as a plane, assuming that the crystal grain is circular. The evaluation results for both grain pitch and core size in this exemplary embodiment were obtained from the mean values for over 200 crystal grains.

Referring now to crystal orientation, the $\Delta\Theta50$ values of the C-axis orientation, measured using X-ray diffraction, were compared as an index for indicating whether the orientation is perpendicular.

Figure 2:
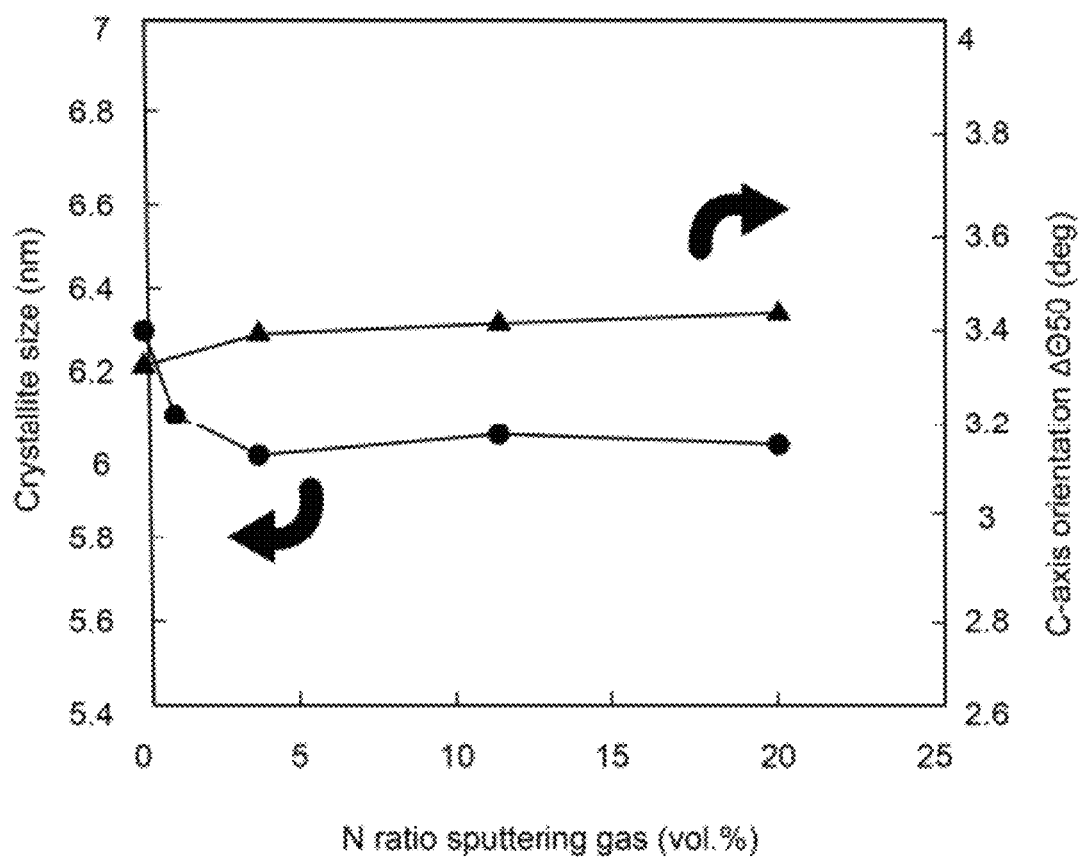
FIG. 2 is a chart showing a relationship between the crystallite size and crystal orientation in a perpendicular magnetic recording medium, according to Exemplary Embodiment 1.

FIG. 2 examines the crystallite size and crystal orientation of the interlayers in the medium of Exemplary Embodiment 1. The horizontal axis shows the proportion of nitrogen in the sputtering gas used to form the second seed layer. It may be clear from this that if the proportion of nitrogen in the sputtering gas is increased when the second seed layer is being formed, the crystallite size can be reduced and the orientation deteriorates only slightly.

Figure 3:
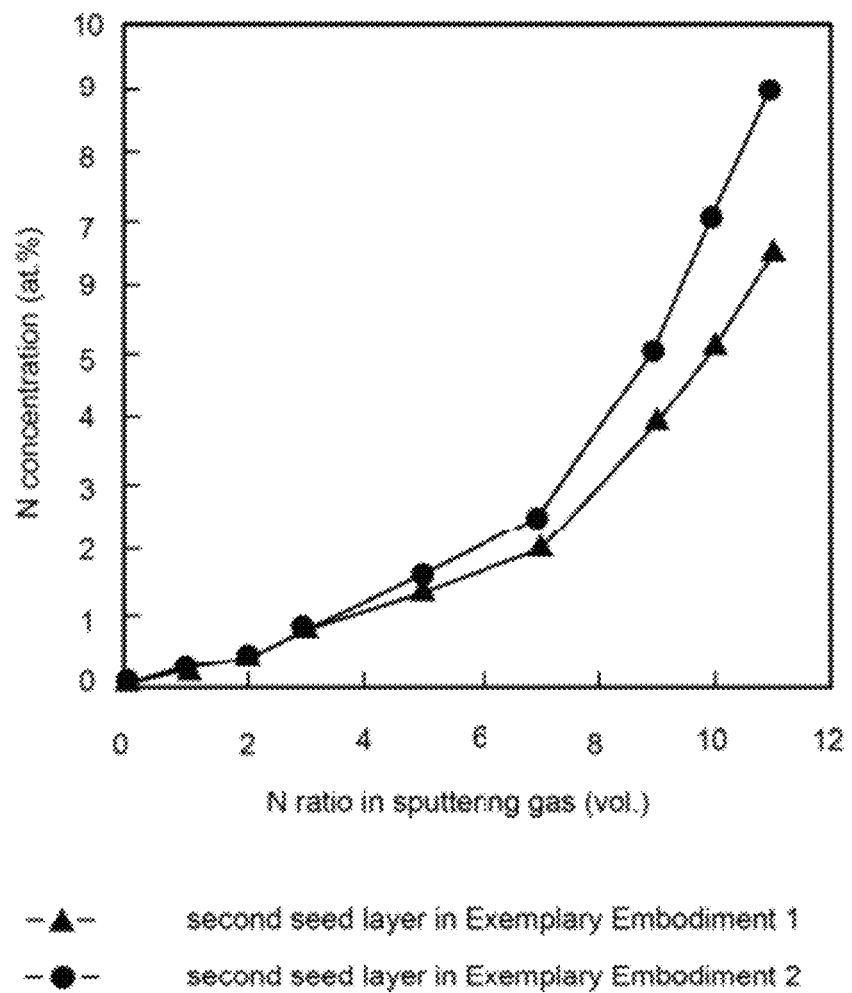
FIG. 3 is a chart showing a relationship between the proportion of nitrogen in the sputtering gas when the second seed layer is being formed and the amount of doped nitrogen in the second seed layer, for a perpendicular magnetic recording medium, according to Exemplary Embodiments 1 and 2.

FIG. 3 examines the relationship between the proportion of nitrogen in the sputtering gas during film formation and the concentration of doped nitrogen in the film for the second seed layer in the media, according to Exemplary Embodiments 1 and 2. When the proportion of nitrogen in the sputtering gas used to form the second seed layer is increased, the concentration of doped nitrogen in the second seed layer also increased. Using the same method below, the relationship between the proportion of nitrogen in the sputtering gas during film formation and the concentration of doped nitrogen in the film was examined.

Figure 4:
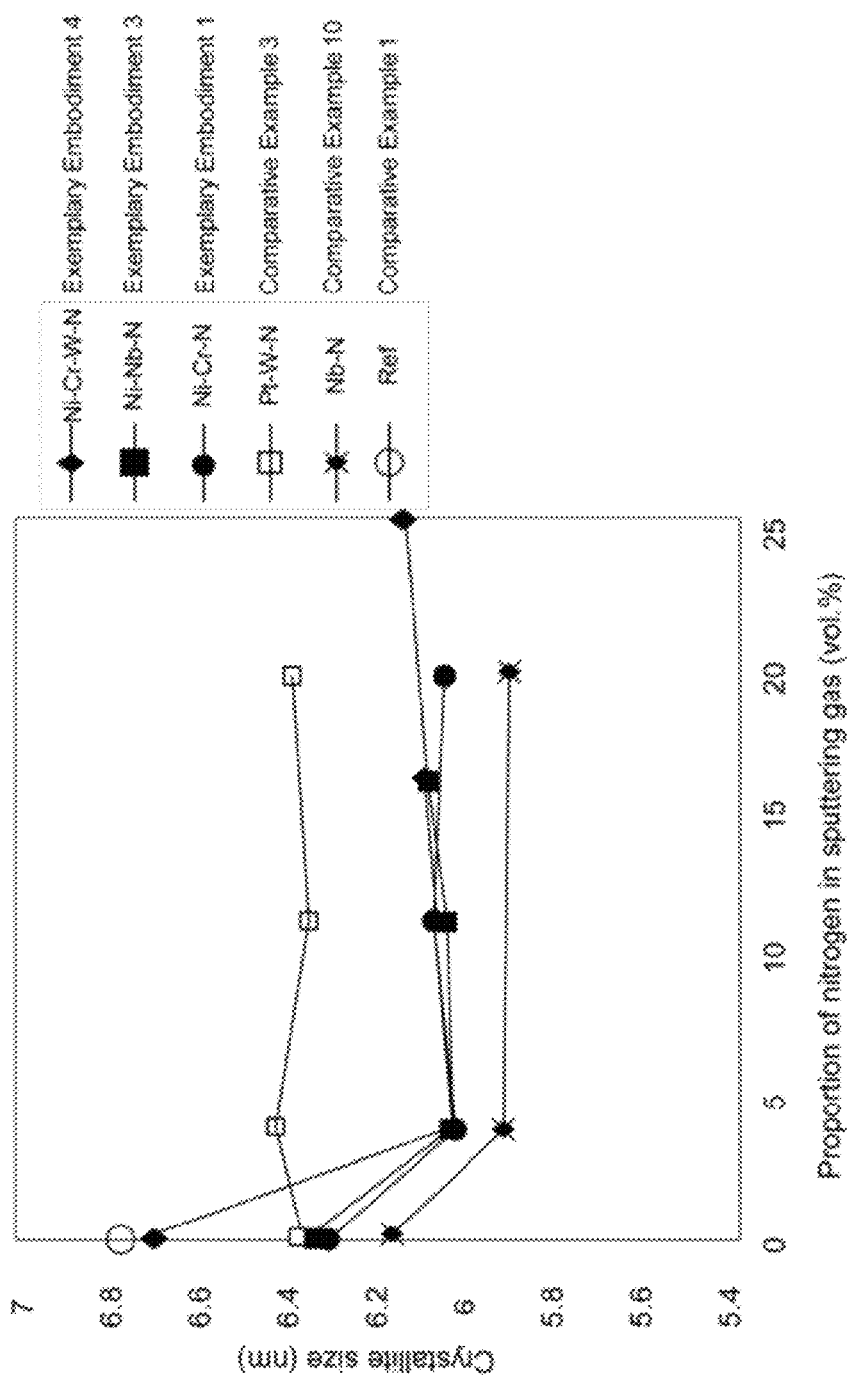
FIG. 4 is a graphical representation of a relationship between the proportion of nitrogen in the sputtering gas used to form the second seed layer and the crystallite size, for a perpendicular magnetic recording medium, according to Exemplary Embodiments 1, 3, and 4, and Comparative Examples 1, 3, and 10.

FIG. 4 examines the crystallite size and the crystal orientation in the interlayers for the media, according to Exemplary Embodiments 1, 3, and 4 and in Comparative Examples 1, 3, and 10. The horizontal axis shows the proportion of nitrogen gas in the sputtering gas used when the second seed layer is formed. It may be clear from this that, according to Exemplary Embodiments 1 and 3, and Comparative Example 10, if the proportion of nitrogen in the sputtering gas is increased when the second seed layer is being formed, the crystallite size can be reduced, but in Comparative Example 3, the crystallite size does not decrease even with nitrogen doping.

Figure 5:
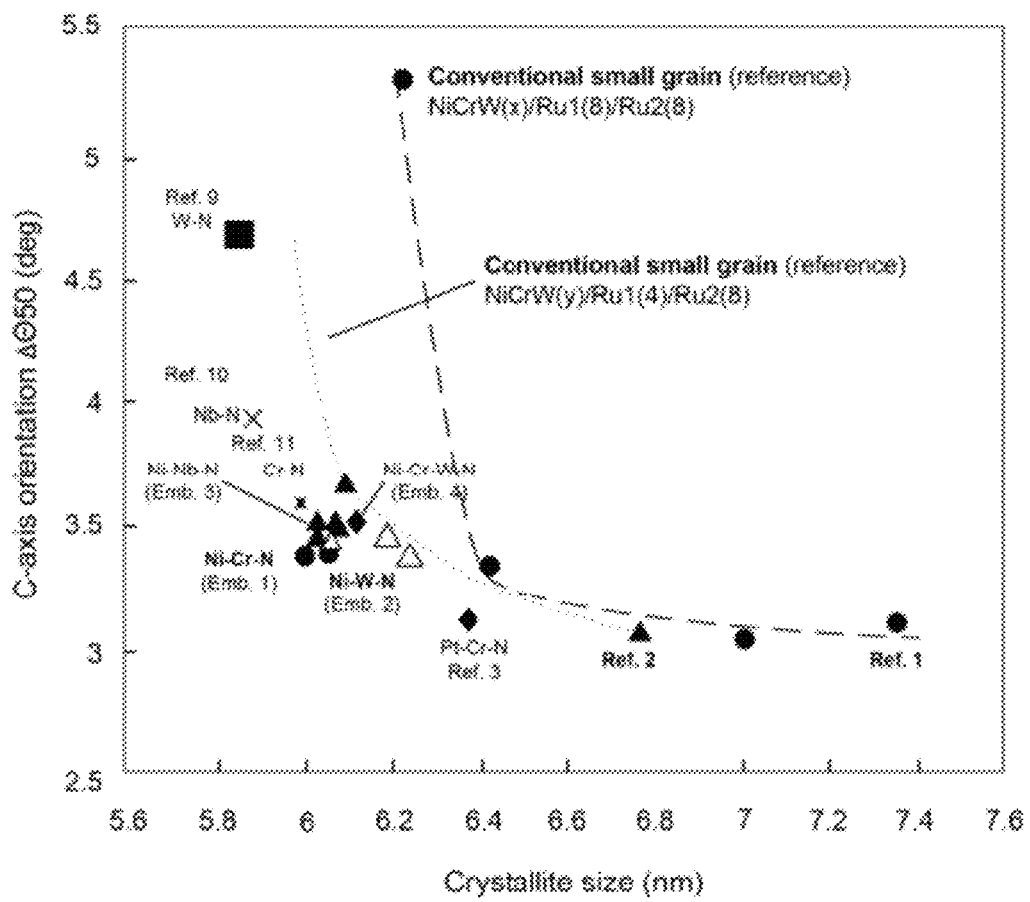
FIG. 5 is a graphical representation of a relationship between the crystallite size and the crystal orientation for a perpendicular magnetic recording medium, according to Exemplary Embodiments 1-4, and Comparative Examples 1-3 and 9-11.

FIG. 5 shows a comparison of the crystallite size and the crystal orientation in the media, according to Exemplary Embodiments 1, 3, and 4, and Comparative Examples 1, 2, 3, 9, 10, and 11. It can be seen that the medium, according to Exemplary Embodiment 1, which had an Ni—Cr—N seed layer had a crystallite size of 6 nm, which was a reduction down to 81% of the value in Comparative Example 1, and the $\Delta\Theta50$ value was 3.3° so there may be little deterioration of the crystal orientation.

The broken line running from Comparative Example 1 and the bottom right of FIG. 5 to the top left joins the measurement points when the thickness x of the first seed layer was varied at 7 nm, 5 nm, 3 nm, and 1 nm, and it shows that when the first seed layer is made thinner, the crystallite size decreased down to about 6.4 nm, but there may be a significant deterioration in the orientation. The dotted line running from Comparative Example 2 and the bottom right of FIG. 5 to the top left shows examples when the first interlayer is thinned to about 4 nm and the thickness y of the first seed layer may be varied at about 5 nm and about 3 nm; it shows that when the first seed layer is made thinner, the crystallite size decreased down to about 6.1 nm, but there may be a significant deterioration in the orientation. The crystallite size remained high at about 6.4 nm in Comparative Example 3. In Comparative Examples 9-11, the crystallite size decreased but the orientation deteriorated significantly.

One crystal grain may be normally formed from fine crystals which are considered as multiple unit crystals, and the fine crystals are referred to as crystallites. Strictly speaking, crystallites and crystal grain size constitute different physical amounts, but if one crystal grain is formed from almost one crystal, it is possible to use the crystallite size to evaluate the crystal grain size. For the thin films evaluated in the exemplary embodiments, there may be a strong correlation between the core size which may be the crystal grain size evaluated by TEM, and the crystallite size which may be the crystal grain size evaluated by in-plane X-ray diffraction, and the crystallite size may be effective for evaluating the crystal grain size.

Figure 6:
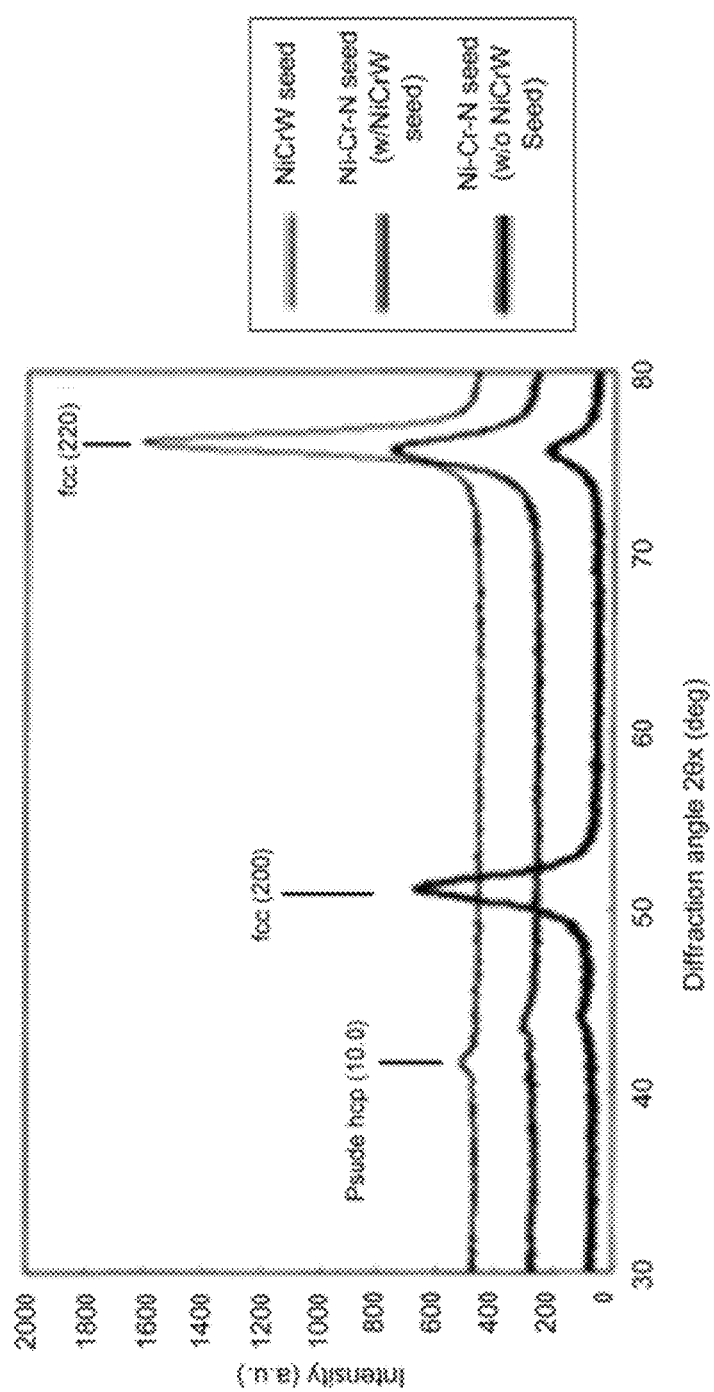
FIG. 6 is a graphical representation of in-plane X-ray diffraction profiles of the first seed layer and second seed layer in a perpendicular magnetic recording medium, according to Exemplary Embodiment 1 and Comparative Example 12.
Figure 7:
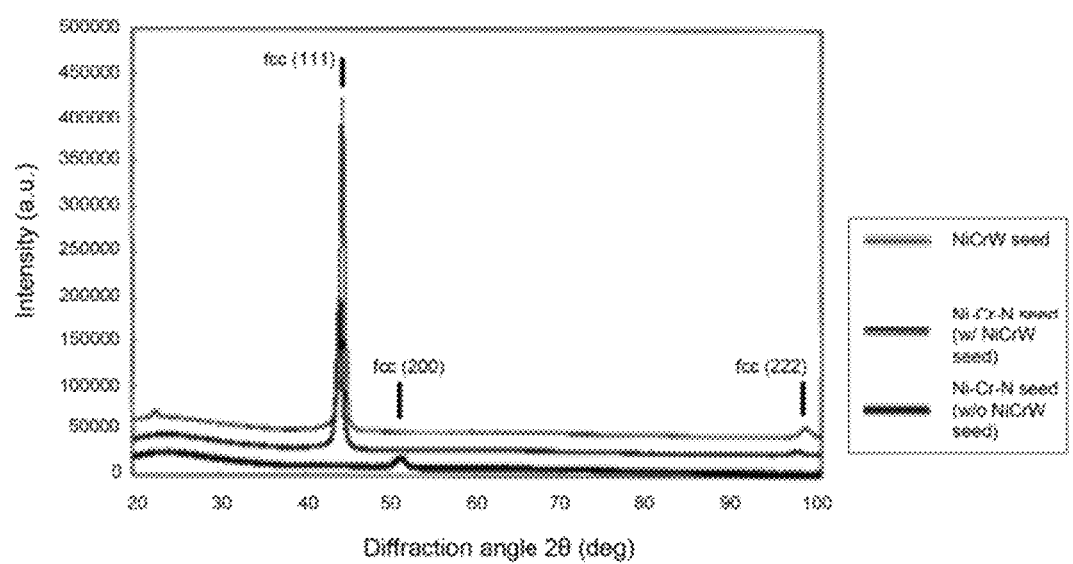
FIG. 7 is a graphical representation of X-ray diffraction profiles in the perpendicular direction of the first seed layer and second seed layer in a perpendicular magnetic recording medium, according to Exemplary Embodiment 1 and Comparative Example 12.

For the crystallinity of the seed layers, a comparison was made in the absence or presence of the first seed layer using X-ray diffraction. FIG. 6 and FIG. 7 show X-ray diffraction patterns in the in-plane direction and perpendicular direction for the Ni—Cr—W first seed layer and the Ni—Cr—N second seed layer, according to Exemplary Embodiment 1 and Comparative Example 12, respectively. When the Ni—Cr—N seed layer was stacked on the first seed layer, as, according to Exemplary Embodiment 1, the X-ray diffraction pattern of the Ni—Cr—N seed layer in the same perpendicular direction as the Ni—Cr—W seed layer showed an fcc (111) plane and (222) plane, and the in-plane X-ray diffraction pattern showed an fcc (220) plane and a pseudo hcp diffraction peak. It should be noted that "pseudo hcp" refers to a structure in which part of the hcp structure may be replaced with an fcc structure, and this structure may be observed when a suitable amount of a bcc element is added to the main component fcc material.

However, when there is no first seed layer as in Comparative Example 12, the X-ray diffraction pattern in the perpendicular direction of the Ni—Cr—N seed layer showed an fcc (200) plane, and a diffraction peak in the fcc (200) plane is also seen in the in-plane X-ray diffraction pattern. In other words, this shows that there were inclined grains which did not have a perpendicular orientation in the crystal plane in the Ni—Cr—N seed layer in this case. Thus, when there is no first seed layer, there may be a marked deterioration in the perpendicular orientation.

Table 1 shows a comparison of the crystallite sizes in each layer for Exemplary Embodiments 1 and 2. In the table, X denotes an added element, indicating Cr or W in this case.

TABLE 1

|  | Ex. Emb. 1 (medium having an Ni—Cr—N seed layer) | Ex. Emb. 2 (medium having an Ni—W—N seed layer) | Comp. Ex. 1 |
|---|---|---|---|
| Ru interlayer | 6.0 | 6.1 | 7.4 |
| Ni—X—N second seed layer | 6.0 | 6.1 | — |
| Ni—Cr—W first seed layer | 9.5 | 9.5 | 9.5 |

The crystallite size in the first seed layer was large at 9.5 nm, but the crystallite size in the second seed layer was reduced to around 6 nm by nitrogen-doping in the second seed layer. The crystallite size in the interlayer grown thereon was also small at around 6 nm. In Comparative Example 1 which did not have a second seed layer, however, the first seed layer having a large grain size was directly below the interlayer, and the crystallite size of the interlayer remained high at 7.4 nm.

Figure 8A:
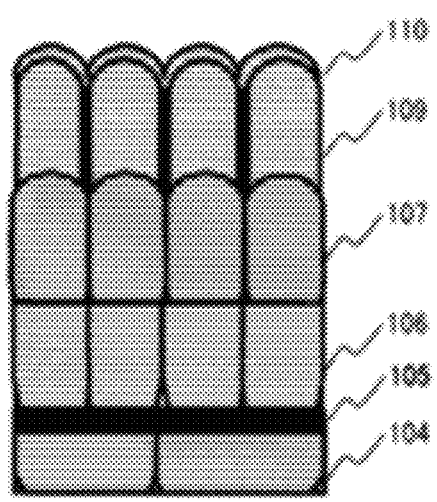
FIG. 8 is a cross sectional schematic diagram of a microstructure for each layer in a perpendicular magnetic recording medium, according to Exemplary Embodiment 1 and Comparative Example 1.
Figure 8B:
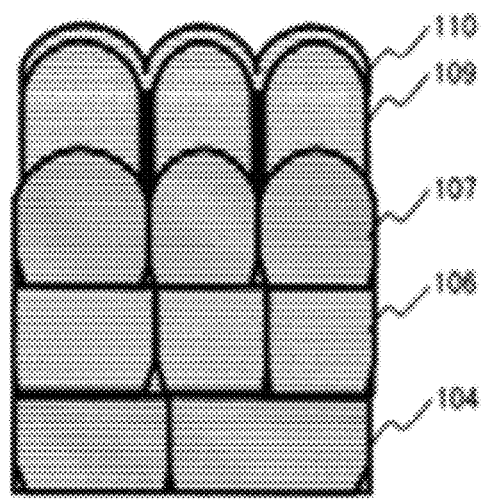

FIG. 8 shows this situation schematically. FIG. 8A shows the exemplary embodiment, while FIG. 8B shows the comparative example. As shown in FIG. 8A, nitrogen-doping made the crystal grain size in the second seed layer sufficiently smaller than that of the first seed layer, and therefore the crystal grain size of the interlayer formed thereon was smaller, and the crystal grain size of the recording layer formed on top of that may also be small. It is believed that there may be less deterioration of the orientation in the interlayer despite the fact that the grain size of the interlayer is small because it has crystal grains of virtually the same size as the second seed layer.

In addition, when the first seed layer is smaller than the second seed layer to an excessive degree, there may be a large amount of deterioration in the crystal orientation, and when the first seed layer is smaller than the interlayer, there may be also a large amount of deterioration in the crystal orientation. When the first seed layer is more than 20% larger than the second seed layer, the crystal grain size may not be adequately reduced. When the grain size in the second seed layer is smaller than that of the first seed layer and is in a range of +10% to −10% of the grain size of the interlayer, it may be possible to obtain a medium in which the crystal grain size in the recording layer is reduced, and in which there may be little deterioration in the crystal orientation.

Figure 9:
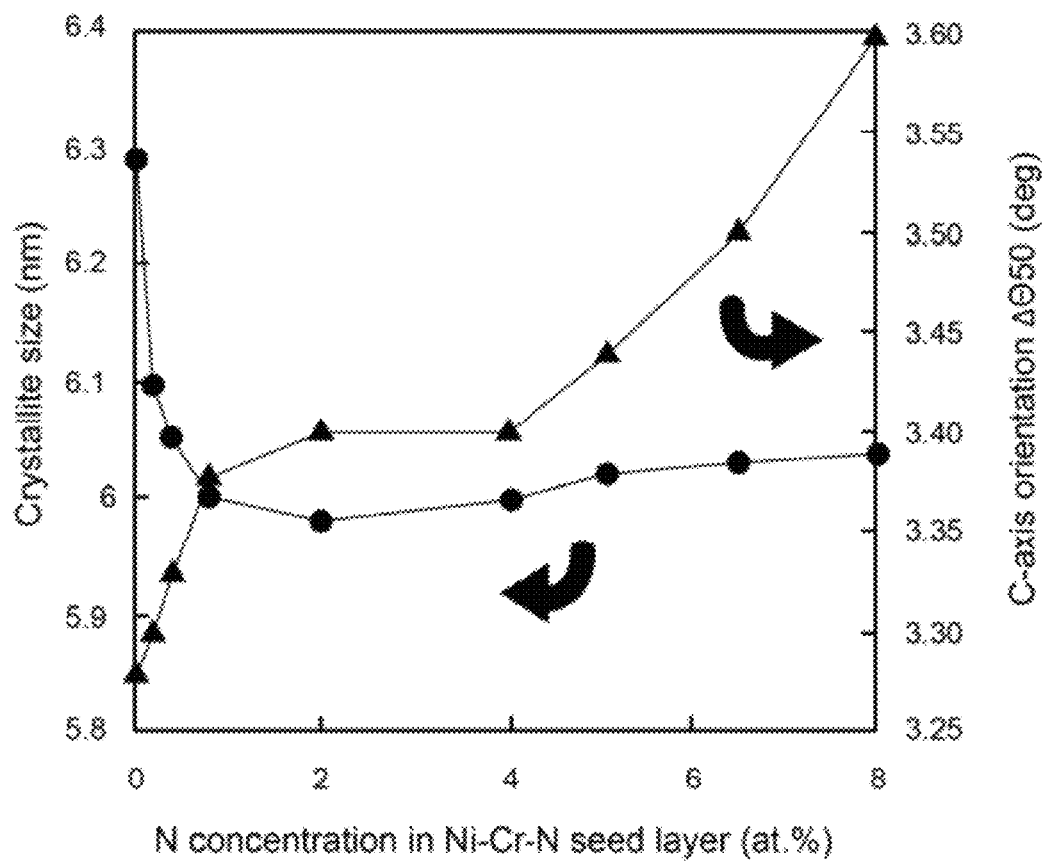
FIG. 9 is a graphical representation of a relationship between crystallite size and crystal orientation with respect to the amount of doped nitrogen in the second seed layer in a perpendicular magnetic recording medium, according to Exemplary Embodiment 1.

FIG. 9 and Table 2 show the relationship between the crystallite size and the crystal orientation with respect to the amount of doped nitrogen in the second seed layer for the medium, according to Exemplary Embodiment 1.

TABLE 2

| Amount of doped nitrogen (at %) | Crystallite size (nm) | ΔΘ50 (deg) |
|---|---|---|
| 0 | 6.29 | 3.28 |
| 0.2 | 6.10 | 3.30 |
| 0.4 | 6.05 | 3.33 |
| 0.8 | 6.00 | 3.38 |
| 2 | 5.98 | 3.4 |
| 4 | 6.00 | 3.4 |
| 5.1 | 6.02 | 3.44 |
| 6.5 | 6.03 | 3.50 |
| 8 | 6.04 | 3.60 |

Thus, the crystallite size decreased and the crystal orientation deteriorated as the amount of doped nitrogen in the second seed layer increased. This means that the amount of doped nitrogen may be preferably 0.2 at % to 6.5 at % in order to be able to suppress deterioration of the orientation and to reduce the crystal grain size. The amount of doped nitrogen may be more preferably 0.8 at % to 4 at % in order to be able to suppress deterioration of the orientation and to reduce the crystal grain size.

Figure 10:
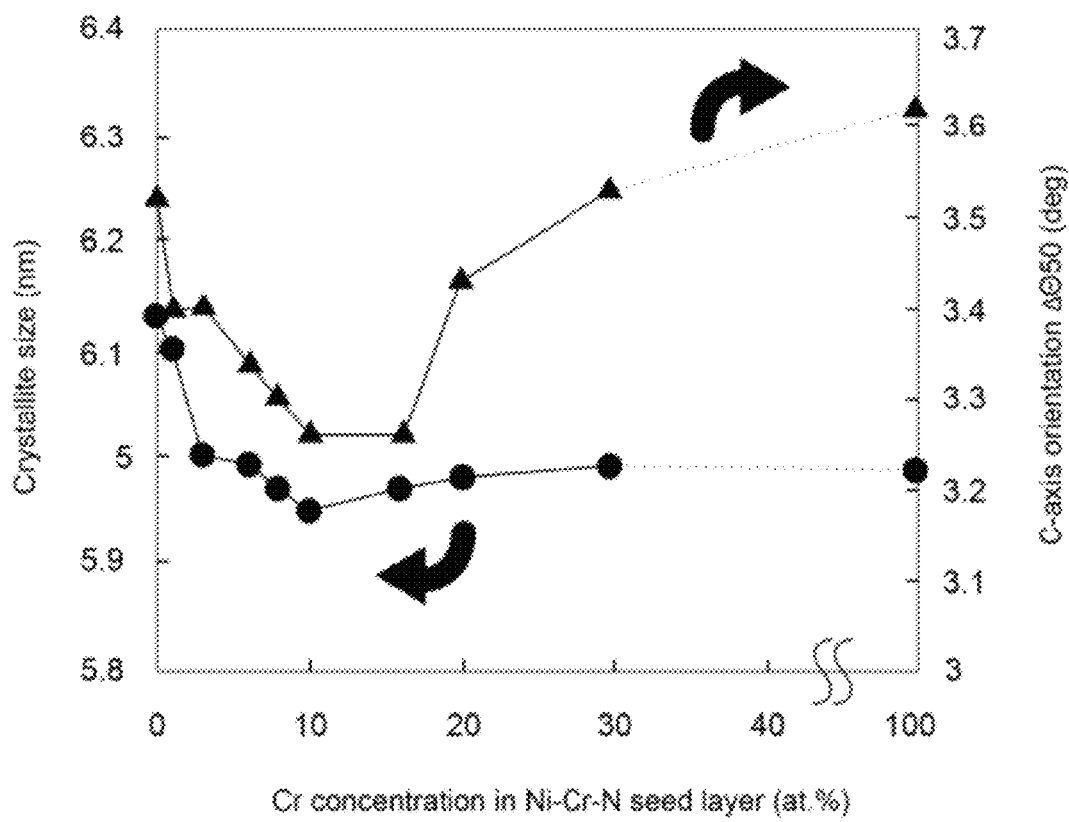
FIG. 10 is a graphical representation of a relationship between crystallite size and crystal orientation with respect to the Cr concentration in the second seed layer in a perpendicular magnetic recording medium, according to Exemplary Embodiment 1.

FIG. 10 and Table 3 show the relationship between the crystallite size and the crystal orientation with respect to Cr concentration in the second seed layer for the medium, according to Exemplary Embodiment 1.

TABLE 3

| Cr concentration (at %) | Crystallite size (nm) | ΔΘ50 (deg) |
|---|---|---|
| 0 | 6.13 | 3.52 |
| 1 | 6.1 | 3.4 |
| 3 | 6 | 3.4 |
| 6 | 5.99 | 3.34 |
| 8 | 5.97 | 3.3 |
| 10 | 5.95 | 3.26 |
| 16 | 5.97 | 3.26 |

TABLE 3-continued

| Cr concentration (at %) | Crystallite size (nm) | ΔΘ50 (deg) |
|---|---|---|
| 20 | 5.98 | 3.43 |
| 30 | 5.99 | 3.53 |

Thus, the crystallite size decreased and good crystal orientation was achieved when the Cr concentration in the second seed layer was within a suitable range. This means that the Cr concentration in the second seed layer may be preferably between about 1 at % and about 20 at % in order to be able to suppress deterioration of the orientation and to reduce the crystal grain size. The Cr concentration may be more preferably between 3 at % and 16 at % in order to be able to suppress deterioration of the orientation and to reduce the crystal grain size.

Furthermore, investigation of the film thickness dependency of the second seed layer showed that the thickness of the second seed layer may be preferably between about 0.5 nm and about 10 nm in order to keep noise to a low level during recording and playback. The thickness of the second seed layer may be more preferably between about 1 nm and about 3 nm in order to reduce the noise more effectively. When an Ni—Cr—N layer was used as the second seed layer, it is possible to produce a medium having superior corrosion resistance, in addition to the advantages mentioned above.

It should be noted that the layer structure, production method, materials, evaluation method, etc., which are not mentioned in this exemplary embodiment are the same as Exemplary Embodiments 2-5.

A description is given of a perpendicular magnetic recording medium which may be produced according to Exemplary Embodiment 1, except that the composition of the second seed layer may be different. The following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 3 nm in thickness as the first seed layer 104; an $Ni_{96}W_3N_1$ layer of approximately 2 nm in thickness as the second seed layer 105; an Ru layer of approximately 4 nm in thickness as the first interlayer 106; an Ru layer of approximately 8 nm in thickness as the second interlayer 107; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C (carbon) layer of approximately 3 nm in thickness as the protective layer 111. The layers were each formed by DC sputtering, but any method may be used. A lubricant 112 was then coated on the C layer to approximately 1 nm in thickness.

The grain pitch in the medium of Exemplary Embodiment 2 was 7.9 nm and the core size was 7.3 nm.

With the medium according to Exemplary Embodiment 2, it is possible to refine the grain size to approximately 84% of the grain size in Comparative Example 1 and to approximately 87% of the grain size in Comparative Example 2, the media in the comparative examples not having the N-doped seed layer.

Figure 11:
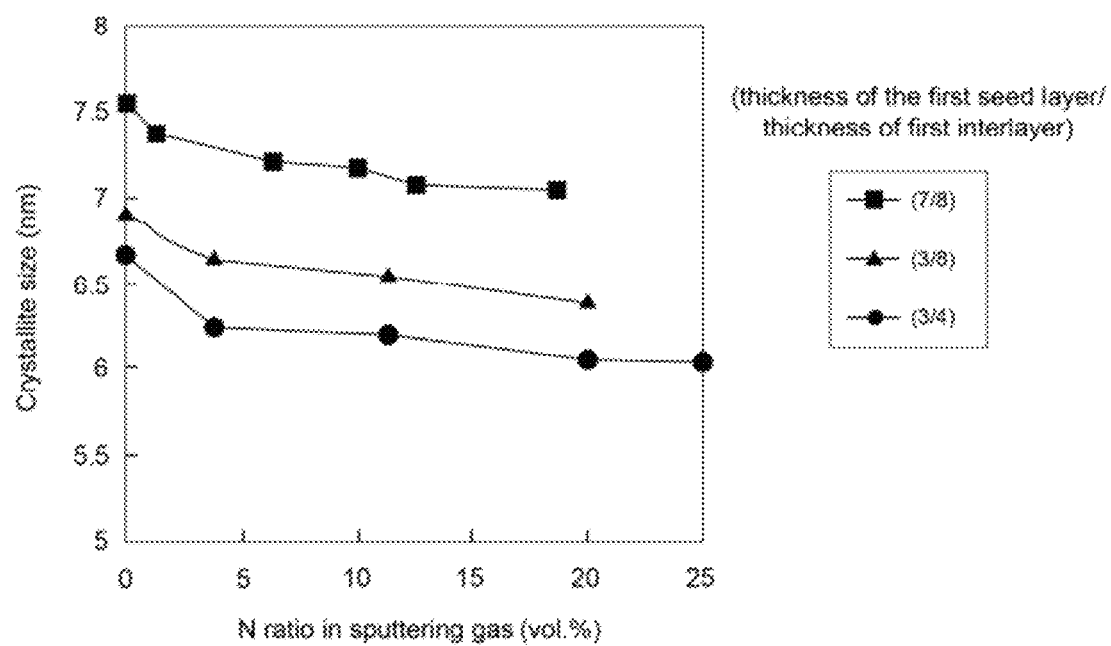
FIG. 11 is a graphical representation of a relationship between the proportion of nitrogen in the sputtering gas used to form the second seed layer, and crystallite size in a perpendicular magnetic recording medium, according to Exemplary Embodiment 2.

FIG. 11 shows the relationship between the proportion of N in the sputtering gas used to form the second seed layer and the crystallite size. As may be clear from FIG. 11, it may be possible to reduce the crystal grain size by nitrogen doping in the second seed layer, even with different thickness combinations for the first seed layer and the first interlayer.

Figure 12:
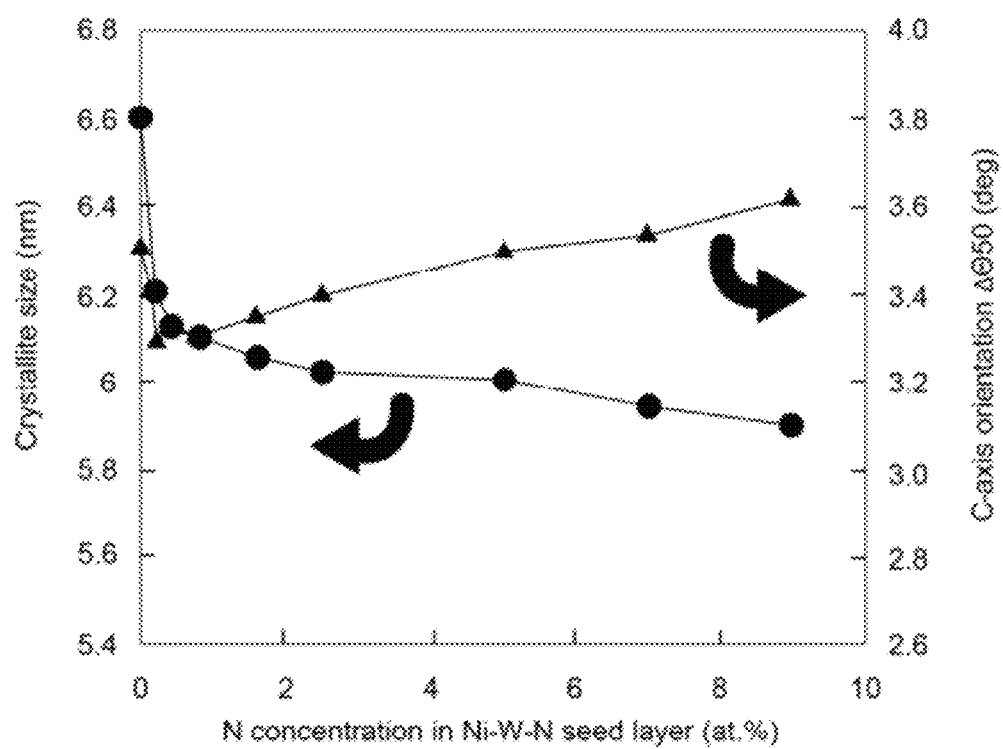
FIG. 12 is a graphical representation of a relationship between crystallite size and crystal orientation with respect to the amount of doped nitrogen in the second seed layer in a perpendicular magnetic recording medium, according to Exemplary Embodiment 2.

FIG. 12 and Table 4 show the relationship between the crystallite size and crystal orientation with respect to the amount of doped nitrogen in the second seed layer, for the medium, according to Exemplary Embodiment 2.

TABLE 4

| Amount of doped nitrogen (at %) | Crystallite size (nm) | ΔΘ50 (deg) |
|---|---|---|
| 0 | 6.60 | 3.51 |
| 0.2 | 6.20 | 3.30 |
| 0.4 | 6.12 | 3.33 |
| 0.8 | 6.10 | 3.30 |
| 1.6 | 6.05 | 3.35 |
| 2.5 | 6.02 | 3.40 |
| 5 | 6.00 | 3.50 |
| 7 | 5.94 | 3.54 |
| 9 | 5.90 | 3.62 |

Thus, the crystallite size decreased as the amount of doped nitrogen in the second seed layer increased. Deterioration of the crystal orientation may be suppressed within a specific range, in some approaches. This means that the amount of doped nitrogen may be preferably between about 0.2 at % and about 5 at % in order to be able to suppress deterioration of the orientation and to reduce the crystal grain size. The amount of doped nitrogen may be more preferably between about 0.8 at % and about 2.5 at % in order to be able to suppress deterioration of the orientation and to reduce the crystal grain size, in another approach.

Figure 13:
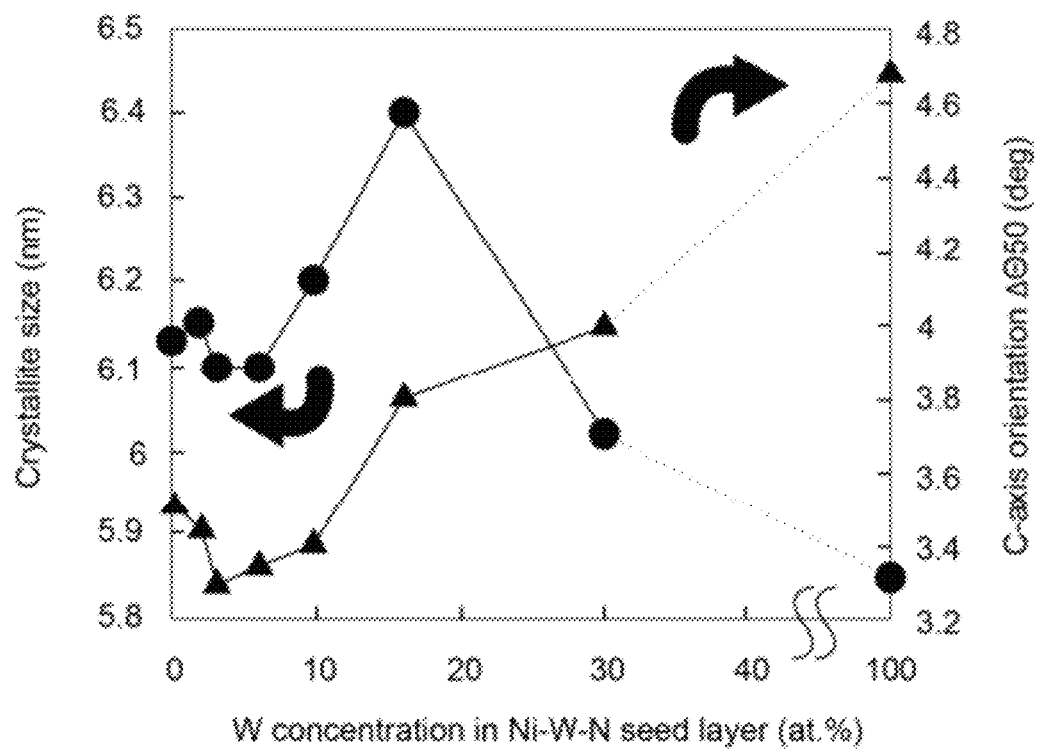
FIG. 13 is a graphical representation of a relationship between crystallite size and crystal orientation with respect to the W concentration in the second seed layer in a perpendicular magnetic recording medium, according to Exemplary Embodiment 2.

FIG. 13 and Table 5 show the relationship between the crystallite size and the crystal orientation with respect to W concentration in the second seed layer for the medium, according to Exemplary Embodiment 2.

TABLE 5

| W concentration (at %) | Crystallite size (nm) | ΔΘ50 (deg) |
|---|---|---|
| 0 | 6.13 | 3.52 |
| 2 | 6.15 | 3.45 |
| 3 | 6.10 | 3.30 |
| 6 | 6.10 | 3.35 |
| 10 | 6.20 | 3.40 |
| 16 | 6.40 | 3.8 |
| 30 | 6.02 | 4.0 |
| 100 | 5.85 | 4.7 |

Thus, the crystallite size decreased and good crystal orientation was achieved when the W concentration in the second seed layer was within a suitable range. This means that the W concentration in the second seed layer may be preferably between approximately 2 at % and approximately 10 at % in order to be able to suppress deterioration of the orientation and to reduce the crystal grain size, in some approaches. The W concentration may be more preferably between about 3 at % and about 6 at % in order to be able to suppress deterioration of the orientation and to reduce the crystal grain size in one approach.

When an Ni—W—N layer was used as the second seed layer, it was possible to produce a medium having the advantages mentioned above in addition to an inexpensive seed layer.

It should be noted that the layer structure, production method, materials, evaluation method, etc., which are not mentioned in this exemplary embodiment are the same as Exemplary Embodiments 1 and 3-5.

A description is given of a perpendicular magnetic recording medium which may be produced according to Exemplary Embodiments 1 and 2, except that the composition of the second seed layer may be different.

The following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 3 rim in thickness as the first seed layer 104; an $Ni_{94}Nb_5N_1$ layer of approximately 2 nm in thickness as the second seed layer 105; an Ru layer of approximately 4 nm in thickness as the first interlayer 106; an Ru layer of approximately 8 nm in thickness as the second interlayer 107; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111, according to one embodiment. The layers were each formed by DC sputtering, however any formation method may be used as known in the art. A lubricant 112 may be then coated on the C layer to approximately 1 nm in thickness.

Table 6 shows the relationship between the crystallite size and crystal orientation with respect to the amount of doped nitrogen in the second seed layer, for the medium, according to Exemplary Embodiment 3.

TABLE 6

| Amount of doped nitrogen (at %) | Crystallite size (nm) | ΔΘ50 (deg) |
|---|---|---|
| 0 | 6.45 | 3.25 |
| 0.2 | 6.20 | 3.30 |
| 0.4 | 6.12 | 3.35 |
| 0.8 | 6.10 | 3.4 |
| 1.6 | 5.99 | 3.4 |
| 2.5 | 6.00 | 3.48 |
| 5 | 5.90 | 3.60 |
| 7 | 5.92 | 3.62 |
| 9 | 5.89 | 3.68 |

Thus, the crystallite size decreased as the amount of doped nitrogen in the second seed layer increased. Deterioration of the crystal orientation may be suppressed within a specific range. This means that the amount of doped nitrogen may be preferably between about 0.2 at % and about 5 at % in order to be able to suppress deterioration of the orientation and to reduce the crystal grain size. The amount of doped nitrogen may be more preferably between about 0.8 at % and about 2.5 at % in order to be able to suppress deterioration of the orientation and to reduce the crystal grain size.

Figure 14:
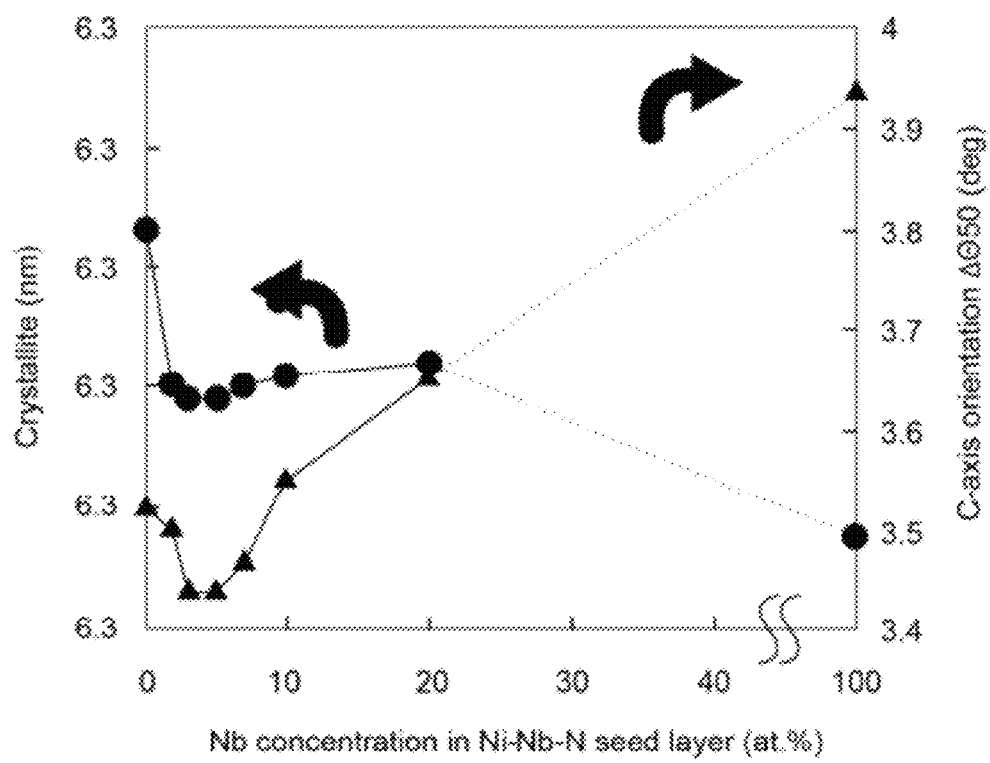
FIG. 14 is a graphical representation of a relationship between crystallite size and crystal orientation with respect to the Nb concentration in the second seed layer in a perpendicular magnetic recording medium, according to Exemplary Embodiment 3.
Figure 15A:
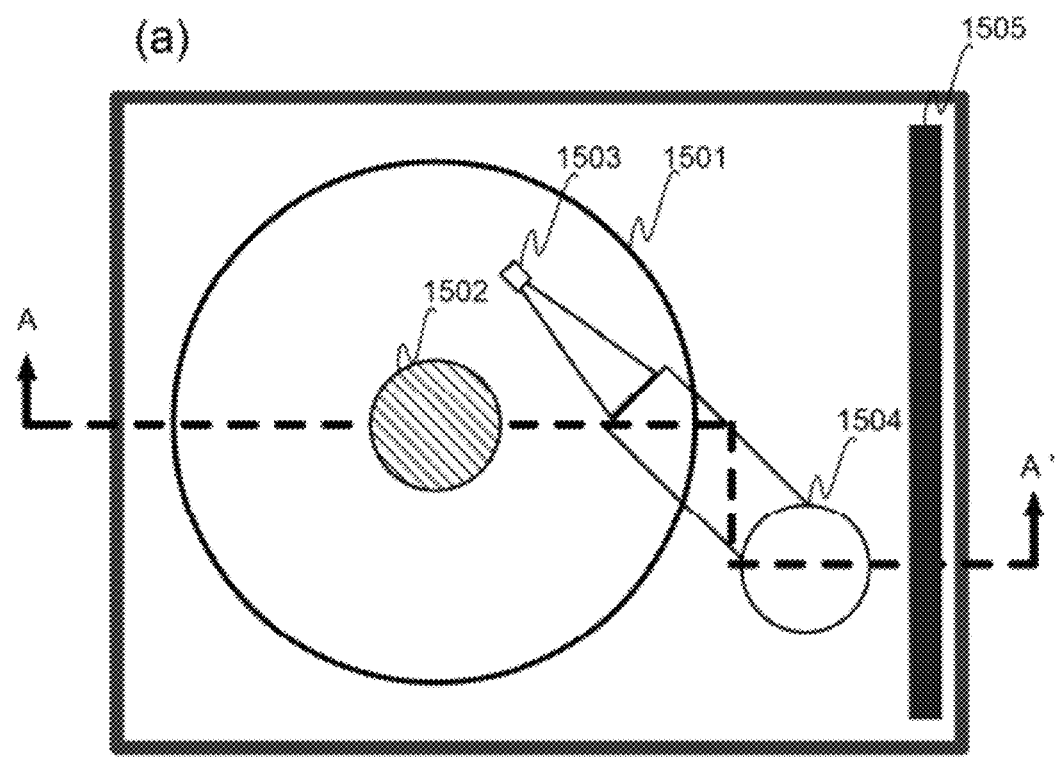
FIG. 15A shows a plan view schematic of a floating slider in a magnetic storage apparatus, according to one embodiment.
Figure 15B:
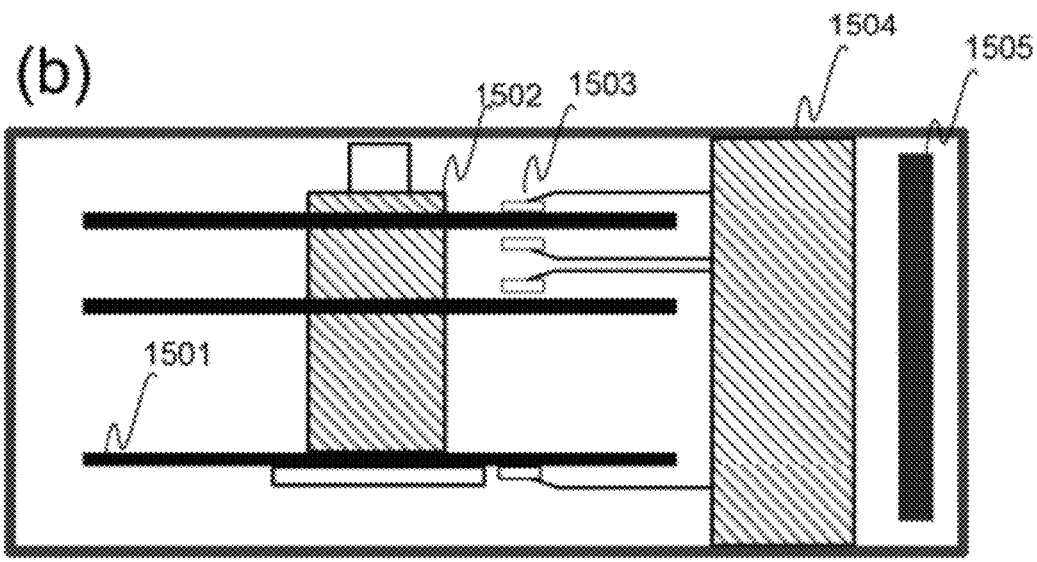
FIG. 15B shows a view in longitudinal section along line A-A' in cross section of a floating slider in a magnetic storage apparatus, according to one embodiment.
Figure 15C:
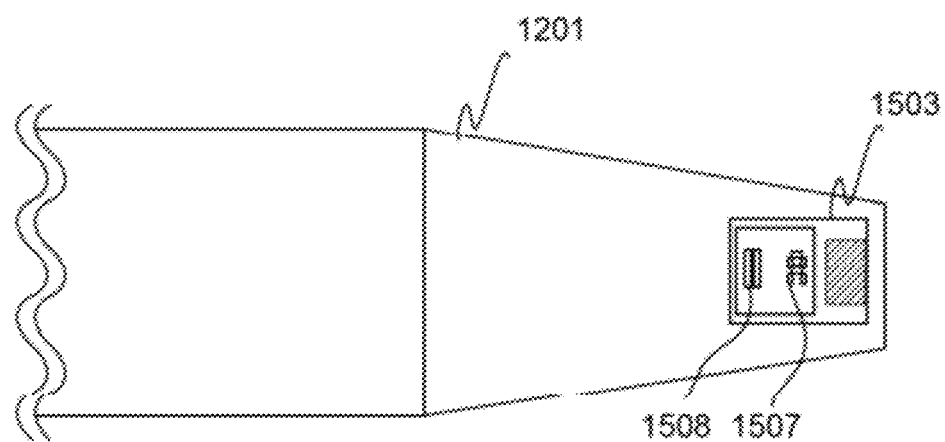
FIG. 15C shows a partial enlargement of a floating slider section, according to one embodiment.
Figure 15D:
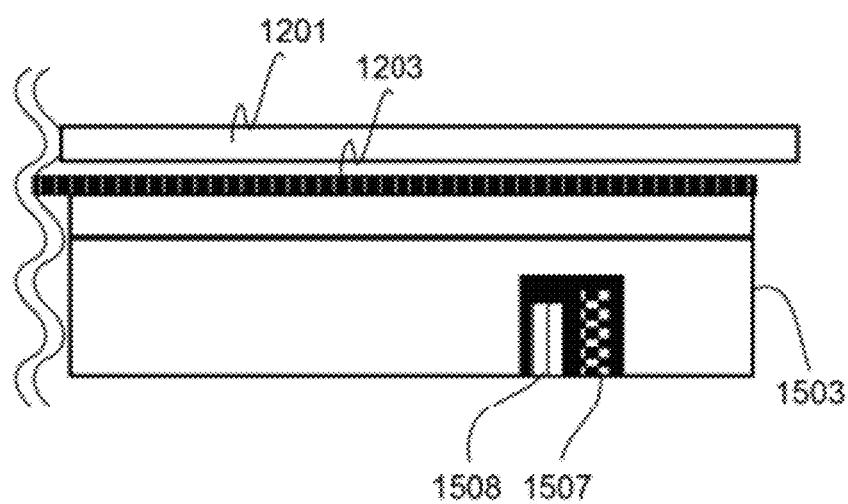
FIG. 15D shows a partial view in cross section of a floating slider in the magnetic storage apparatus, according to one embodiment.

FIG. 14 and Table 7 show the relationship between the crystallite size and the crystal orientation with respect to Nb concentration in the second seed layer for the medium, according to Exemplary Embodiment 3.

TABLE 7

| Nb concentration (at %) | Crystallite size (nm) | ΔΘ50 (deg) |
|---|---|---|
| 0 | 6.13 | 3.52 |
| 2 | 6.00 | 3.50 |
| 3 | 5.99 | 3.44 |
| 5 | 5.99 | 3.44 |
| 7 | 6.00 | 3.47 |
| 10 | 6.01 | 3.55 |
| 20 | 6.02 | 3.65 |
| 100 | 5.88 | 3.94 |

Thus, the crystallite size decreased and good crystal orientation was achieved when the Nb concentration in the second seed layer was within a suitable range. This means that the Nb concentration in the second seed layer may be preferably between about 2 at % and about 10 at % in order to be able to suppress deterioration of the orientation and to reduce the crystal grain size in one approach. The Nb concentration may be more preferably between about 3 at % and about 7 at % in order to be able to suppress deterioration of the orientation and to reduce the crystal grain size in another approach. When an Ni—Nb—N layer was used as the second seed layer, it was possible to obtain a medium having superior flatness, in addition to the advantages mentioned above.

It should be noted that the layer structure, production method, materials, evaluation method, etc., not mentioned in this exemplary embodiment are the same as Exemplary Embodiments 1, 2, 4, and 5.

A description is given of a perpendicular magnetic recording medium which may be produced in the same way as Exemplary Embodiments 1, 2, and 3, except that the composition of the second seed layer may be different. The following layers were formed in succession on the substrate 100: an $Ni_{63}Ta38$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 3 nm in thickness as the first seed layer 104; an $Ni_{85}Cr_8W_6N_1$ layer of approximately 2 nm in thickness as the second seed layer 105; an Ru layer of approximately 4 nm in thickness as the first interlayer 106; an Ru layer of approximately 8 nm in thickness as the second interlayer 107; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111, according to one approach. The layers were each formed by DC sputtering; however, any method of formation may be used as known in the art. A lubricant 112 may be then coated on the C layer to approximately 1 nm in thickness.

Table 8 shows the relationship between the crystallite size and crystal orientation with respect to the amount of doped nitrogen in the second seed layer, for the medium, according to Exemplary Embodiment 4.

TABLE 8

| Amount of doped nitrogen (at %) | Crystallite size (nm) | ΔΘ50 (deg) |
|---|---|---|
| 0 | 6.29 | 3.26 |
| 0.2 | 6.10 | 3.24 |
| 0.4 | 6.05 | 3.26 |
| 0.8 | 6.00 | 3.30 |
| 2.0 | 5.97 | 3.41 |
| 4.0 | 5.97 | 3.48 |
| 5.1 | 5.96 | 3.53 |
| 6.5 | 5.94 | 3.58 |
| 8.0 | 5.95 | 3.65 |

Thus, the crystallite size decreased as the amount of doped nitrogen in the second seed layer increased. Deterioration of the crystal orientation may be suppressed within a specific range. This means that the crystallite size decreased and good crystal orientation may be achieved, thereby making it possible to suppress deterioration of the orientation and to reduce the crystal grain size. The amount of doped nitrogen may be preferably between about 0.2 at % and about 6.5 at % in order to be able to suppress deterioration of the orientation and to reduce the crystal grain size, in one approach. The amount of doped nitrogen may be more preferably between about 0.8 at % and about 4 at % in order to be able to suppress deterioration of the orientation and to reduce the crystal grain size in another approach.

For the medium, according to Exemplary Embodiment 4, the crystallite size may be reduced and good crystal orientation may be achieved when the Cr and W concentrations in the second seed layer are within a suitable range, in the same way as Exemplary Embodiments 1 and 2.

TABLE 9

| Total concentration of added elements (at %) | ΔΘ50 (deg) |
|---|---|
| 3 | 3.44 |
| 6 | 3.35 |
| 14 | 3.3 |
| 16 | 3.4 |
| 20 | 3.5 |
| 30 | 3.75 |

The Cr concentration in the second seed layer may be preferably between about 1 at % and about 20 at %, the W concentration in the second seed layer may be preferably between about 2 at % and about 10 at %, and the total concentration of Cr and W may be preferably in a range of no more than about 20 at %, according to various embodiments.

The amount of doped nitrogen may be preferably between about 0.8 at % and about 2.5 at % in order to be able to suppress deterioration of the orientation and to reduce the crystal grain size in one approach. The Cr concentration may be preferably between about 3 at % and about 16 at %, the W concentration may be preferably between about 3 at % and about 6 at %, and the total concentration of Cr and W may be preferably in a range of no more than about 16 at %, according to various embodiments.

When an Ni—W—Cr—N layer was used for the second seed layer, it was possible to obtain a medium which has the advantages mentioned above, in addition to a balance of the advantages afforded by adding each of the elements, namely the low cost of an Ni—W—N layer and the strong corrosion resistance of an Ni—Cr—N layer.

The same advantages can also be achieved by using any one or more of V, Mo, Ta, Cr, W, and Nb, instead of the Cr, W, or Nb which were shown, according to Exemplary Embodiments 1-4.

When the amount of elements added to the second seed layer, according to Exemplary Embodiments 1-4, were 0, in other words when an Ni—N layer was used for the second seed layer, there was a smaller effect than in the case where Cr, etc., was added, but it may still be possible to obtain a medium having a reduced crystal grain size and good crystal orientation.

It should be noted that the layer structure, production method, materials, evaluation method, etc., which are not mentioned in this exemplary embodiment are the same as Exemplary Embodiments 1, 2, 3, and 5.

FIG. 15 schematically shows a magnetic storage apparatus according to an exemplary embodiment. FIG. 15A is a schematic shown as a plan view, and FIG. 15B shows a view in cross section along the line A-A' thereof. FIG. 15C depicts a schematic of the head, and FIG. 15D is a schematic seen from the side of the head main part, according to various embodiments.

This apparatus includes a perpendicular magnetic recording medium 1501, a drive unit 1502 for driving the same, a magnetic head floating slider 1503, a magnetic head drive mechanism 1504, and a magnetic head recording/playback signal processing mechanism 1505. The magnetic head has separate recording and playback sections which are formed on the magnetic head slider, and the recording head may be provided with a mechanism 1507 for forming a magnetic field, according to one embodiment. The magnetic head may be also provided with a playback current detection means 1508, and may playback recorded bits.

The floating slider 1503 may be mounted on a suspension 1201 with a flexing member 1203 interposed in order to improve the positioning accuracy.

In addition, the medium disclosed, according to Exemplary Embodiment 1, may be installed in the above magnetic storage apparatus, and after it has been confirmed that the head is floating stably at a head floating amount of 6 nm, recording may be carried out using this head. The recording and playback were evaluated under recording conditions of linear recording density 1600 kBPI and track width 80 nm, and the recording characteristics achieved were at BER10-4 with good SNR.

The content of the exemplary embodiments described above relate to one example involving a lubricant, protective layer, cap layer, recording layer, interlayer, underlayer, soft magnetic layer, and substrate, but the same advantages may also be gained using any other combination of materials disclosed in the exemplary embodiments, according to various embodiments.

It should be noted that the layer structure, production method, materials, evaluation method, etc., which are not mentioned in this exemplary embodiment are the same as Exemplary Embodiments 1-4.

Figure 16:
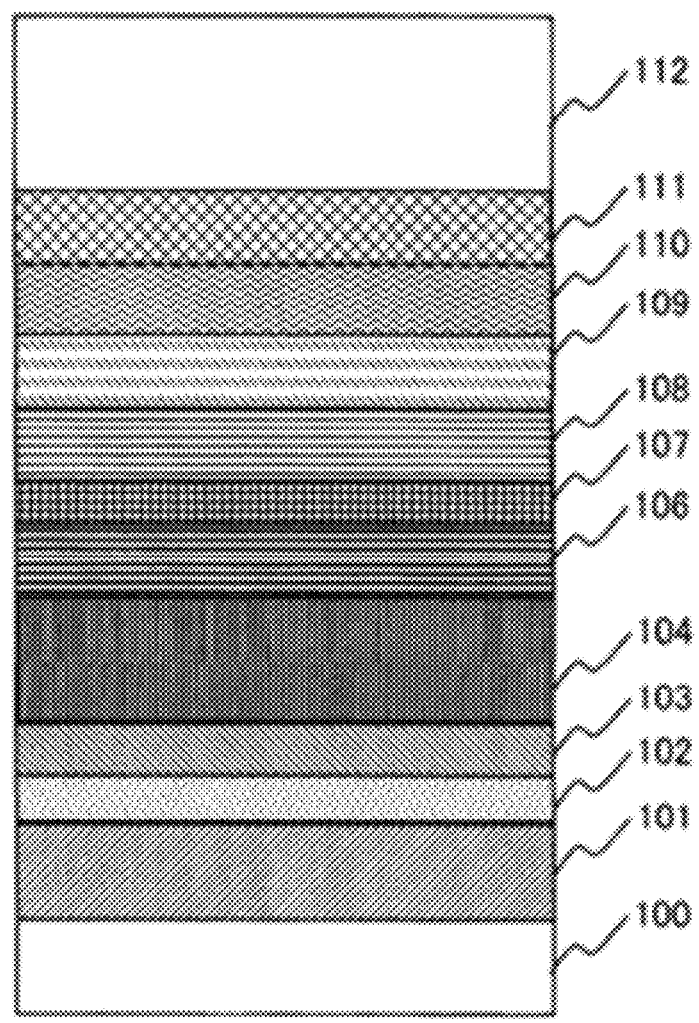
FIG. 16 is a cross sectional schematic diagram showing a structure of a perpendicular magnetic recording medium, according to one embodiment.

FIG. 16 schematically shows a cross-sectional structure of a perpendicular magnetic recording medium including a comparative example which may be produced in the same way, except that it may be lacking a nitrogen-doped seed layer. The following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 7 nm in thickness as the first seed layer 104; an Ru layer of approximately 4 nm in thickness as the first interlayer 106; an Ru layer of approximately 8 nm in thickness as the second interlayer 107; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111. The layers were each formed by DC sputtering; however, any formation method may be used as known in the art. A lubricant 112 may be coated on the C layer to approximately 1 nm in thickness, in one approach.

The crystal grain size of the medium in Comparative Example 1 was large, the grain pitch being about 9.4 nm and the core size being about 8.6 nm. The crystallite size according to in-plane X-ray diffraction was large at 7.4 nm.

A perpendicular magnetic recording medium constituting Comparative Example 2 may be produced in the same way, except that the first seed layer 104 may be thinner than the first seed layer in Comparative Example 1. The following layers, were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 5 nm in thickness as the first seed layer 104; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111. The layers were each formed by DC sputtering; however, any formation method may be used as known in the art. A lubricant 112 may be coated on the C layer to approximately 1 nm in thickness.

The crystal grain size of the medium in Comparative Example 2 was large, the grain pitch being 9.0 nm, the core size being 8.6 nm, and the crystallite size being 6.8 nm.

Perpendicular magnetic recording media in Comparative Examples 3-8 were produced in the same way, except that the main component of the second seed layer was changed from Ni to Pt, etc.

In Comparative Example 3, the following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 3 nm in thickness as the first seed layer 104; a $Pt_{89}Cr_{10}$—$N_1$ layer of approximately 2 nm in thickness as the second seed layer 105; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111. The layers were each formed by DC sputtering; however, any formation method may be used as known in the art. A lubricant 112 may be coated on the C layer to approximately 1 nm in thickness.

In Comparative Example 4, a $Pt_{88}W_{10}$—$N_2$ layer of approximately 2 nm in thickness may be used as the second seed layer 105, in one approach. In Comparative Example 5, a $Pt_{89}Ti_{10}$—$N_1$ layer of approximately 2 nm in thickness may be used as the second seed layer 105, in one approach. In Comparative Example 6, an $Ru_{98}$—$N_2$ layer of approximately 2 nm in thickness may be used as the second seed layer 105, in one approach. In Comparative Example 7, an $Ru_{89}Hf_{10}$—$N_1$ layer of approximately 2 nm in thickness may be used as the second seed layer 105, in one approach. In Comparative Example 8, an $Ru_{88}Cr_{10}$—$N_2$ layer of approximately 2 nm in thickness may be used as the second seed layer 105, in one approach.

With the media in Comparative Examples 3-8, the second seed layer may be subjected to nitrogen doping, but no effect of reducing the crystallite size is anticipated to be seen.

Perpendicular magnetic recording media in Comparative Examples 9-11 were produced in the same way, except that the main component of the second seed layer was changed to W, etc.

In Comparative Example 9, the following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 3 nm in thickness as the first seed layer 104; a W—N layer of approximately 2 nm in thickness as the second seed layer 105; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111. The layers were each formed by DC sputtering; however, any formation method as known in the art may be used. A lubricant 112 may be coated on the C layer to approximately 1 nm in thickness.

In Comparative Example 10, an Nb—N layer of approximately 2 nm in thickness may be used as the second seed layer 105, in one approach. In Comparative Example 11, a Cr—N layer of approximately 2 nm in thickness may be used as the second seed layer 105, in one approach.

With the media in Comparative Examples 9-11, when nitrogen may be added to the sputtering gas during the formation of the second seed layer in order to carry out nitrogen doping, the crystallite size decreased, in one approach. However, there may be a large deterioration in the crystal orientation.

Perpendicular magnetic recording media in Comparative Examples 12 and 13 were produced in the same way as Exemplary Embodiments 1 and 2, except that they were lacking the first seed layer 104. For the medium in Comparative Example 12, the following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{89}Cr_{10}N_1$ layer of approximately 5 nm in thickness as the second seed layer 105; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111. The layers were each formed by DC sputtering; however, any formation method as known in the art may be used. A lubricant 112 may be coated on the C layer to approximately 1 nm in thickness.

In Comparative Example 13, an $Ni_{96}W_3N_1$ layer of approximately 5 nm in thickness may be used as the second seed layer 105.

With the media in Comparative Examples 12, 13, when nitrogen was added to the sputtering gas during the formation of the second seed layer in order to carry out nitrogen doping, the crystallite size decreased. However, there may be a marked deterioration in the crystal orientation.

A perpendicular magnetic recording medium constituting Comparative Example 14 may be produced in the same way as, according to Exemplary Embodiment 1, except that a nitrogen-doped second seed layer 105 may be present, but interlayers were not present. The following layers were formed in succession on the substrate 100: an $Ni_{63}Ta_{38}$ layer of approximately 30 nm in thickness as the adhesion underlayer 101; an Fe—Co—Ta—Zr layer of approximately 30 nm in thickness as the soft magnetic layer 102; an $Ni_{63}Ta_{38}$ layer of approximately 4 nm in thickness as the underlayer 103; an $Ni_{84}Cr_{10}W_6$ layer of approximately 3 nm in thickness as the first seed layer 104; an $Ni_{89}Cr_{10}N_1$ layer of approximately 2 nm in thickness as the second seed layer 105; an Ru-oxide layer 108 of approximately 1 nm in thickness as the onset layer; a Co—Cr—Pt-Oxide layer 109 of approximately 13 nm in thickness as the recording layer; a $Co_{61}Cr_{19}Pt_{12}B_8$ layer 110 of approximately 3 nm in thickness as the cap layer; and a C layer of approximately 3 nm in thickness as the protective layer 111. The layers were each formed by DC sputtering; however, any formation method as known in the art may be used. A lubricant 112 may be coated on the C layer to approximately 1 nm in thickness. With the medium in Comparative Example 14, the grain separation may be inadequate, and therefore the coercive force may be as low as 3 kOe, in one approach.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium comprising:
    a soft magnetic underlayer formed above a substrate;
    a lower seed layer formed above the soft magnetic underlayer;
    at least one upper seed layer formed above the lower seed layer; and
    a perpendicular recording layer formed above the at least one upper seed layer;
    wherein the at least one upper seed layer comprises Ni or a Ni based alloy including N,
    wherein the lower seed layer includes Ni and at least one element selected from a group consisting of: W and Cr,
    wherein the at least one upper seed layer comprises a Ni alloy including N and at least one element selected from a group consisting of: V, Cr, Nb, Mo, Ta, and W,
    wherein the at least one upper seed layer includes N in a concentration range of about 0.2 at % to about 6.5 at % and Cr in a concentration range of about 1 at % to about 20 at %,
    wherein an average size of fine grains in the lower seed layer is greater than an average size of fine grains in the at least one upper seed layer, and
    wherein a perpendicular orientation of grains of the at least one upper seed layer is in the same direction as a perpendicular orientation of grains of the lower seed layer.

2. The perpendicular magnetic recording medium of claim 1, wherein the at least one upper seed layer includes W in a concentration range of about 2 at % to about 10 at %.

3. A perpendicular magnetic recording medium comprising:
    a soft magnetic underlayer formed above a substrate;
    a lower seed layer formed above the soft magnetic underlayer;
    at least one upper seed layer formed above the lower seed layer;
    a perpendicular recording layer formed above the at least one upper seed layer; and
    an interlayer positioned between the at least one upper seed layer and the perpendicular recording layer, wherein an average size of fine grains in the at least one upper seed layer is within ±10% of an average size of fine grains in the interlayer,
    wherein the at least one upper seed layer comprises Ni or a Ni based alloy including N,
    wherein the lower seed layer includes Ni and at least one element selected from a group consisting of: W and Cr,
    wherein the at least one upper seed layer comprises a Ni alloy including N and at least one element selected from a group consisting of: V, Cr, Nb, Mo, Ta, and W,
    wherein the at least one upper seed layer includes N in a concentration range of about 0.2 at % to about 6.5 at % and Cr in a concentration range of about 1 at % to about 20 at %, and
    wherein a perpendicular orientation of grains of the at least one upper seed layer is in the same direction as a perpendicular orientation of grains of the lower seed layer.

4. The perpendicular magnetic recording medium of claim 1, wherein the concentration range of the N in the at least one upper seed layer is from about 0.2 at % to about 5 at %.

5. A perpendicular magnetic recording medium comprising:
    a soft magnetic underlayer formed above a substrate;
    a lower seed layer formed above the soft magnetic underlayer;
    at least one upper seed layer formed above the lower seed layer; and
    a perpendicular recording layer formed above the at least one upper seed layer;
    wherein the at least one upper seed layer comprises Ni or a Ni based alloy including N,
    wherein the lower seed layer includes Ni and at least one element selected from a group consisting of: W and Cr,
    wherein the at least one upper seed layer comprises a Ni alloy including N and at least one element selected from a group consisting of: V, Cr, Nb, Mo, Ta, and W,
    wherein the at least one upper seed layer includes N in a concentration range of about 0.2 at % to about 5 at % and W in a concentration range of about 2 at % to about 10 at %, and
    wherein a perpendicular orientation of grains of the at least one upper seed layer is in the same direction as a perpendicular orientation of grains of the lower seed layer.

6. The perpendicular magnetic recording medium of claim 5, wherein an average size of tine grains in the lower seed layer is greater than an average size of fine grains in the at least one upper seed layer.

7. The perpendicular magnetic recording medium of claim 5, further comprising an interlayer positioned between the at least one upper seed layer and the perpendicular recording layer, wherein an average size of fine grains in the at least one upper seed layer is within ±10% of an average size of fine grains in the interlayer.

8. The perpendicular magnetic recording medium of claim 5, further comprising an interlayer positioned between the at least one upper seed layer and the perpendicular recording layer, wherein an average size of fine grains in the lower seed layer is greater than an average size of fine grains in the at least one upper seed layer, and wherein an average size of fine grains in the at least one upper seed layer is within ±10% of an average size of fine grains in the interlayer.

9. The perpendicular magnetic recording medium of claim 8, wherein the at least one upper seed layer includes Cr in a concentration range of about 1 at % to about 20 at %.

10. The perpendicular magnetic recording medium of claim 5, further comprising an interlayer positioned between the at least one upper seed layer and the perpendicular recording layer, and wherein the at least one upper seed layer includes Cr in a concentration range of about 1 at % to about 20 at %.

11. The perpendicular magnetic recording medium of claim 10, wherein an average size of fine grains in the lower seed layer is greater than an average size of fine grains in the at least one upper seed layer, and wherein an average size of fine grains in the at least one upper seed layer is within ±10% of an average size of fine grains in the interlayer.

12. The perpendicular magnetic recording medium of claim 1, further comprising an interlayer positioned between the at least one upper seed layer and the perpendicular recording layer, wherein an average size of fine grains in the at least one upper seed layer is within ±10% of an average size of fine grains in the interlayer.

13. The perpendicular magnetic recording medium of claim 3, wherein an average size of fine grains in the lower seed layer is greater than an average size of fine grains in the at least one upper seed layer.

14. The perpendicular magnetic recording medium of claim 3, wherein the at least one upper seed layer includes W in a concentration range of about 2 at % to about 10 at %.

* * * * *

UNITED STATES PATENT AND TRADEMARK OFFICE
CERTIFICATE OF CORRECTION

PATENT NO.        : 8,703,307 B2
APPLICATION NO.   : 12/903135
DATED             : April 22, 2014
INVENTOR(S)       : Hirotsune et al.

It is certified that error appears in the above-identified patent and that said Letters Patent is hereby corrected as shown below:

In the specification:

col. 5, line 37 replace "maybe" with --may be--;

col. 5, line 45 replace "including gas" with --including $N_2$ gas--;

col. 11, line 11 replace "3 rim" with --3 nm--.

In the claims:

col. 18, line 45 replace "tine" with --fine--.

Signed and Sealed this
Twenty-second Day of July, 2014

Michelle K. Lee
*Deputy Director of the United States Patent and Trademark Office*